April 23, 1957     C. F. RIBAK     2,789,372
MAP AND LOCATING DEVICE
Filed Aug. 17, 1955     2 Sheets-Sheet 1
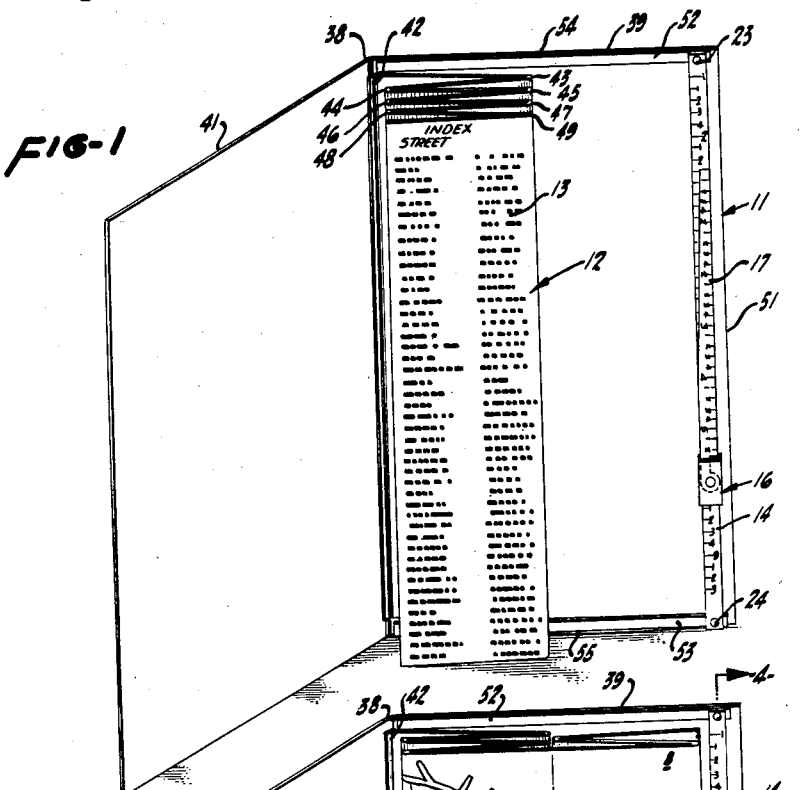
INVENTOR.
CHARLES F. RIBAK

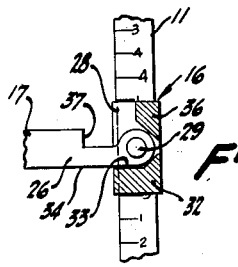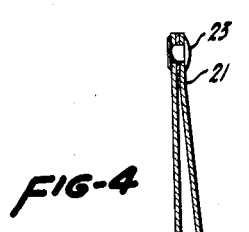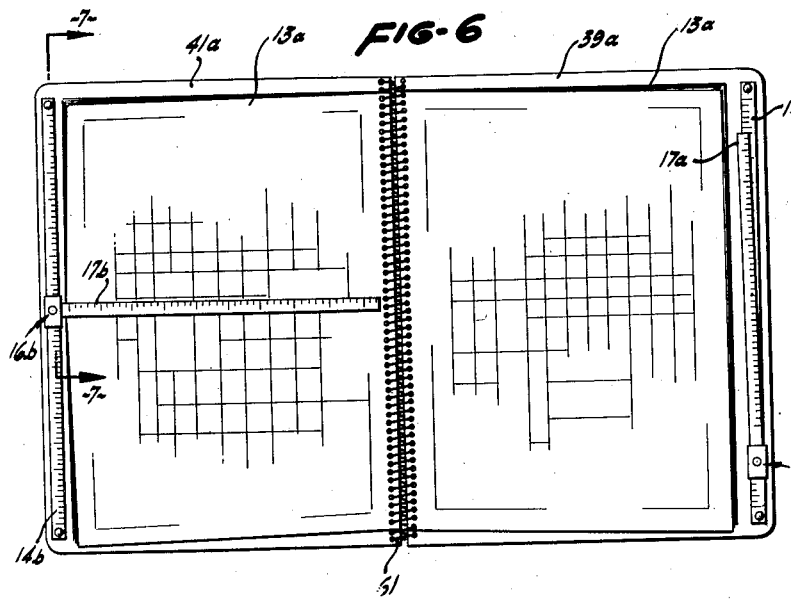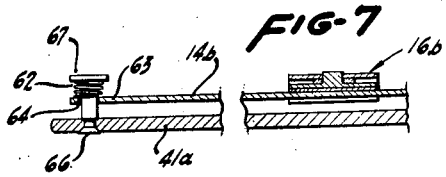

United States Patent Office 2,789,372
Patented Apr. 23, 1957

2,789,372

MAP AND LOCATING DEVICE

Charles F. Ribak, Alameda, Calif.

Application August 17, 1955, Serial No. 529,020

2 Claims. (Cl. 35—40)

The invention relates to maps, plats, charts and the like, and devices used in connection therewith for facilitating the location of points or other information recorded thereon.

In common types of city and highway maps, it is usually necessary, in order to develop the amount of detail required for densely filled areas, and yet obtain adequate over-all coverage, to use relatively large sheets which are quite bulky and unwieldy for most purposes. To aid in this regard, the sheet may be folded into sections so as to reduce the size of the map when folded, or the map may be prepared in book form with a plurality of map pages bound in a cover. Normally these maps are over-ruled with a gridiron of squares and other markings so that the user, by reference to an appropriate index, will be directed to a relatively small area of the map for searching out the information sought. Of course the direction to such an area is only approximate, and the over-printed lines and symbols significantly deface the map and interfere with and confuse the location of the data sought.

It is an object of the present invention to provide a combination of a map which is conveniently divided into a plurality of sections mounted for selective turning up in a common area for viewing, and a scanning type locating device mounted for movement over the area and over the sections superimposed thereon for easily, rapidly, and accurately pin-pointing the information sought.

Another object of the present invention is to provide a map and locating device of the character described which will enable the printing of the map without the customary gridiron squares and other interfering lines and data as above explained, thereby greatly improving the legibility and certainty of the map.

A further object of the present invention is to provide a map and locating device of the character described which is composed of a minimum number of sturdily formed parts adapted for inexpensive mass production and assembly so as to thereby permit and encourage the widespread use and distribution of the map units.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a perspective view of a map and locating device constructed in accordance with the present invention.

Figure 2 is a perspective view of a map and locating device similar to Figure 1 but showing certain of the portions in operative position.

Figure 3 is a cross sectional view of the map and locating device taken substantially on the plane of line 3—3 of Figure 2.

Figure 4 is a cross sectional view of the map and locating device taken substantially on the plane of line 4—4 of Figure 2.

Figure 5 is a fragmentary cross sectional view taken substantially on the plane of line 5—5 of Figure 3.

Figure 6 is a front elevation of a modified form of the map and locating device.

Figure 7 is a fragmentary cross sectional view of the map and locating device illustrated in Figure 6 and is taken substantially on the plane of line 7—7 of Figure 6.

The map and locating device of the present invention consists briefly of a support 11, a map 12 including a plurality of sections 13 secured to the support for relative movement and for selective turning up of the sections in a common area for viewing, an elongated guide 14 carried by the support 11 along one edge of the common area, a slide 16 carried by the guide 14 for movement over the length thereof, and an arm 17 carried by the slide in perpendicular relation to the guide 14, as seen in Figure 2, for extension across the area in overlying relation to the sections 13. As a particularly important feature of the present invention, the support for the arm 17 is arranged to permit movement of the arm to and from the support 11 so as to accommodate various superimposed heights of the sections. This is here accomplished in part by the forming of the guide 14 of resiliently flexible material such as from a strip of metal or plastic and by securing the ends only of the guide to the support so that the guide may bow to and from the support in accordance with the heights of sections stacked up on the support. The opposite ends 21 and 22 of the guide may be secured to the underlying support 11 by any suitable method such as by gluing or riveting, as by rivets 23 and 24 as here shown. In this connection, it is also desirable to form the arm 17 from an elongated strip of resiliently flexible material such as metal or plastic so that the arm itself may flex to and from the support as successive portions of the map may be positioned under the arm.

As another feature of the present invention, the arm 17 is preferably pivotally carried by the slide for movement of the arm between an inoperative position lying generally parallel to and overlying the elongated guide 14, as illustrated in Figure 1, and operable position with the arm extending perpendicularly from the guide and across and in overlying relation to the sections 13, as illustrated in Figure 2. Preferably also stop means is provided on the slide 16 for automatically setting the arm in its perpendicularly related operable position as described. As here best shown in Figures 3, 4, and 5, the slide 16 is made up of a plurality of superimposed sections with one end 26 of the arm 17 sandwiched or carried therebetween. The lowermost section 27 may be of channel shape, as here shown in Figure 3, so as to slidably embrace the guide 14. A bearing plate 28 is fastened to the upper side of the channel 27 and is provided with an outwardly projecting stud 29. The arm end 26 is formed with a bearing opening slipped over the stud 29, as seen in Figures 3 and 5, and the assembly is capped by a cover plate 31. The bearing plate 28 is formed with a raised shoulder or section 32 arranged in spaced relation to the stud 29 and having a side 33 positioned to engage a side 34 of the arm upon rotation of the latter to its operable position. A second raised shoulder or section 36 may be provided on the bearing plate 28, as shown in Figure 5, to cooperate with a recess 37 formed in the arm end 26 so as to serve as a stop, limiting the arcuate movement of the arm in a clockwise direction, as viewed in Figure 5, and to a position parallel to and overlying the guide 14.

Preferably the support 11 is composed of a rectangular exterior cover sheet of relatively heavy paper or the like folded medially as shown at 38 to provide hinged cover sections 39 and 41, and the map sheet 12 is preferably of elongated, generally rectangular form, having one end 42 secured, as by gluing, stapling, stitching, or the like, to the inside surface of the cover section 39 parallel to the fold line 38. In keeping with this arrangement the map sheet is here formed with a plurality of folds 43, 44, 45, 46, 47, 48, and 49, arranged parallel to the fold line 38 of the cover so as to divide the map sheet into the plurality of sections 13 which may be conveniently folded for successive turning up for viewing with the sections arranged in a stacked relation on the inside face of the cover section 39 as illustrated in Figures 1 and 2, with the outer edges of the sections in either case spaced from the outer edge 51 of the cover section so as to leave an edge area for the mounting of the guide 14. The guide 14 is thus located in juxtaposition to the superimposed outer edges of the map sections.

As a feature of the present construction a pair of reinforcing strips 52 and 53 are suitably secured as by gluing, stitching, stapling or the like to the cover section 39 along the upper and lower edges 54 and 55 thereof so as to stiffen the cover section and provide adequate strength and resistance to curling or bending, particularly when operating the slide unit. Strips of plastic or metal are quite satisfactory for this purpose and enable the use of ordinary weight cover materials. Also preferably the outer ends of the strips 52 and 53 are inserted under the opposite ends 21 and 22 of the guide so as to act as spacers supporting the guide 14 in spaced relation to the cover to provide free running clearance for the slide 16.

As another nice feature of the present arrangement, the several folds 43–49 are arranged to divide the map sheet 12 into the plurality of sections 13 all having a substantially common width which is something less than one-half the width of the cover section 39, whereby the sections may be successively swung about their fold line for turning up of successive adjacent pairs of the sections for viewing as seen in Figure 2. To facilitate folding, the widths of successive sections are graduated slightly narrower from the inner to the outer folds to accommodate the thickness of the paper used. In this manner, successive unfolding of adjacent map sections may be effected with the sections lying perfectly flat without completely unfolding the large map sheet. Also, this arrangement permits the user to thumb through the map and to locate and closely search individual areas while keeping his bearings with respect to the whole area.

A modified form of the map and locating device is illustrated in Figures 6 and 7 of the drawing wherein the map is composed of a booklike structure having a pair of covers 39a and 41a and a plurality of pages 13a bound therebetween so as to open out on the covers for viewing. In this form of the invention, a pair of map scanning and locating devices of the general character above described are used on the two covers. Accordingly an elongated guide 14a is secured to the outer edge area of the cover 39a and a similar guide 14b is secured in a like manner to the outer edge area of the cover 41a. Slides 16a and 16b are carried by the guides 14a and 14b and in turn carry arms 17a and 17b for extension toward the center of the book and into overlying relation with the pages 13a. Preferably the arms are pivotally secured to the slides so as to move between an inoperable position superimposed over the guide as illustrated at the right hand side of Figure 6, and an operable position swung perpendicularly to the guide as illustrated at the left hand side of Figure 6. As will be observed, the pages 13a have a width somewhat less than the cover so as to leave exposed edge areas on the cover to the outside of the pages for the mounting of the guides 14a and 14b. Accordingly when the arms 17a and 17b are swung to their inoperable positions the book may be closed in a most compact fashion.

Preferably the pages 13a are secured to the covers 39a and 41a by a ring-type binding 61 to afford a flat opening out of the covers 39a and 41a and similarly an opening out of the pages 13a into superimposed flat planes on the cover. If desired openable rings may be used to provide an interchangeable loose leaf arrangement of the map sheets. A spiral wire binding of the conventional type is illustrated in Figure 6.

The form of the invention as illustrated in Figures 5 and 6 is intended to be a somewhat more expensive, more permanent, and a generally deluxe edition of the unit. Accordingly the guides 14a and 14b are preferably formed of a somewhat heavier, and therefore less flexible, metal or the like. In order to obtain the desired movement of the arms 17a and 17b to and from the covers 39a and 41a so as to accommodate the arms to various heights of the pages, spring means 62 is preferably interposed in the mountings for the guides. As here shown, see Figure 7, each of the opposite ends 63 of the guides are formed with an opening 64 slidably mounted for reciprocation on a stud 66 secured to the cover. Normally the guide is urged in the direction of the cover by a helical spring 62 which is mounted around the stud 66 and compressed between an enlarged outer head 67 on the stud and the end 63 of the guide. Thus the guide is permitted to move outwardly to accommodate increased depth of pages against the resilient resistance of spring 62.

As will be observed in both forms of the invention, the guide 14 and arm 17 are provided with spaced graduations clearly imprinted thereon so that by moving the slide 16 along the guide to a given graduation and then running out the arm 17 to a given graduation, any city, town, road, street, river or other recorded data or information may be quickly, conveniently and accurately pin-pointed. For this purpose, certain of the sheets or covers are provided with a suitable index of information recorded according to section or page, and co-ordinate graduations of the guide and arm. With this system, it is totally unnecessary to overprint the present map with the customary gridiron squares and other printed markings and symbols which tend to deface the map and interfere with and confuse the location of the data recorded on the map. Accordingly, the present map is much clearer, far less confusing and generally much easier to read.

I claim:

1. A map and locating device comprising, a support, a map including a plurality of sections secured to said support for relative movement of said sections and for selective turning up of said sections into overlying superimposed relation in a common area for viewing, an elongated guide of flexible material secured at its ends to said support along one edge of said area, a slide carried by said guide for movement over the length thereof, and an arm carried by said slide in perpendicular relation to said guide and extending across said area in overlying relation to said sections, said guide functioning to bow to and from said support to accommodate said arm to superimposed heights of said sections.

2. A map and locating device comprising, a book composed of a pair of covers and a plurality of pages bound therebetween and arranged for opening out upon said covers for viewing, an elongated guide secured to the inside face of each of said covers adjacent to the outer edge thereof, a slide carried by each of said guides, an arm pivotally carried by each of said slides for movement between an inoperable position overlying said guide and an operable position extending perpendicularly from said guide toward the center of said book in overlying relation to said pages, and spring means supporting each of said guides for movement to and from said covers so as to accommodate said arms to various superimposed heights of said pages.

(References on following page)

References Cited in the file of this patent

UNITED STATES PATENTS

| | | |
|---|---|---|
| 975,924 | Aray | Nov. 15, 1910 |
| 1,245,311 | Black | Nov. 6, 1917 |
| 1,276,657 | Ibanez | Aug. 20, 1918 |
| 2,001,633 | Segovia | May 14, 1935 |
| 2,191,109 | Kittredge | Feb. 20, 1940 |
| 2,411,300 | Southwell | Nov. 19, 1946 |

FOREIGN PATENTS

| | | |
|---|---|---|
| 28,149 | Great Britain | 1910 |
| 275,450 | Great Britain | Aug. 11, 1927 |